Nov. 18, 1941.  J. A. PETERSON  2,262,903
WHEELBARROW
Filed Jan. 28, 1941   2 Sheets-Sheet 1

Inventor
John Albin Peterson

By Clarence A. O'Brien
Attorney

Nov. 18, 1941.    J. A. PETERSON    2,262,903
WHEELBARROW
Filed Jan. 28, 1941    2 Sheets-Sheet 2
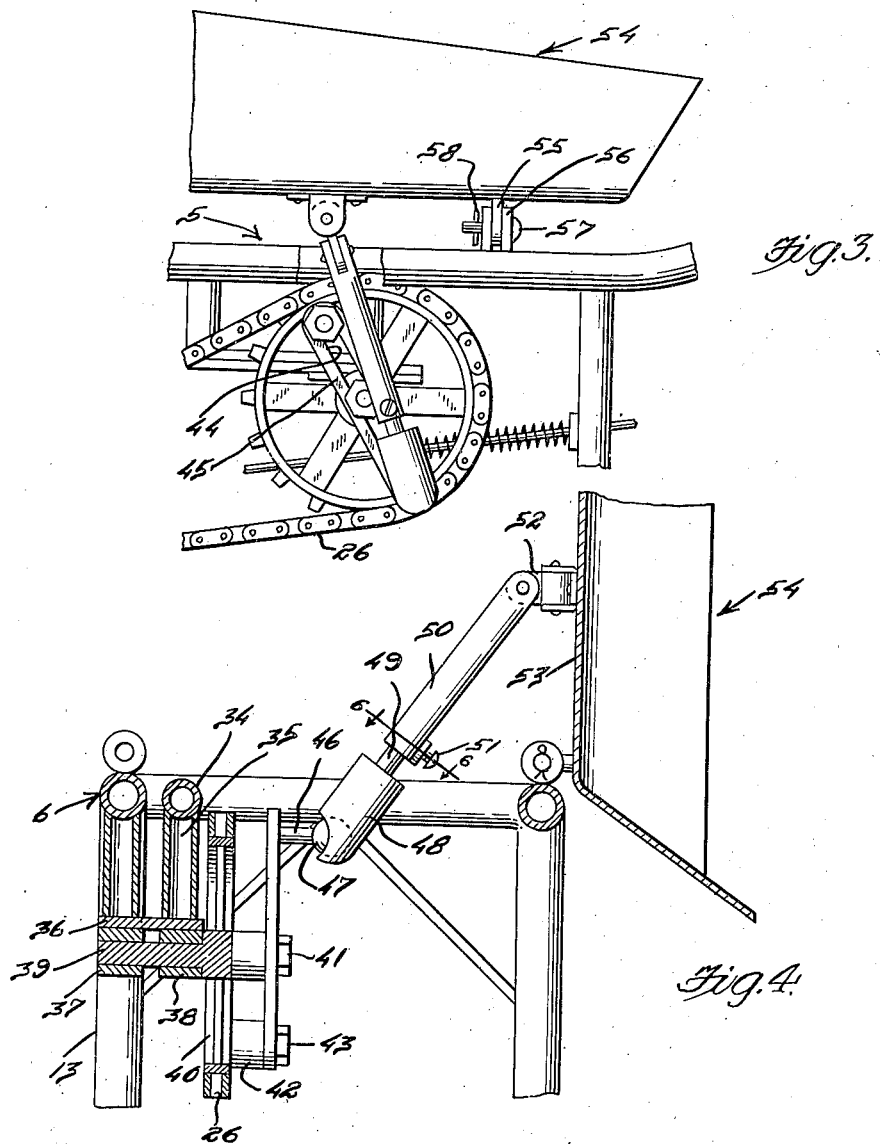
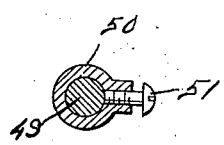
Inventor
John Albin Peterson
By Clarence A. O'Brien
Attorney Patented Nov. 18, 1941

2,262,903

UNITED STATES PATENT OFFICE 2,262,903

WHEELBARROW

John Albin Peterson, Rainier, Oreg.

Application January 28, 1941, Serial No. 376,380

2 Claims. (Cl. 298—3)

My invention relates to improvements in wheel barrows, and particularly to an arrangement of this character in which means is incorporated for dumping the contents of the tray by tilting the tray mechanically and in the course of forward motion of the wheel barrow, so as to make stopping for the dumping operation unnecessary, and the primary object of my invention is to provide a simple and efficient arrangement of this character.

Other important objects and advantages of my invention will be apparent from a reading of the following description taken in connection with the appended drawings, wherein for purposes of illustration I have shown a preferred embodiment of my invention.

In the drawings:

Figure 3 is a fragmentary enlarged side elevational view.

Figure 4 is an enlarged fragmentary transverse vertical sectional view taken through Figure 1 along the line 4—4 and looking in the direction of the arrows.

Figure 6 is a horizontal sectional view taken along the line 6—6 of Figure 4 and looking in the direction of the arrows.

Figure 1:
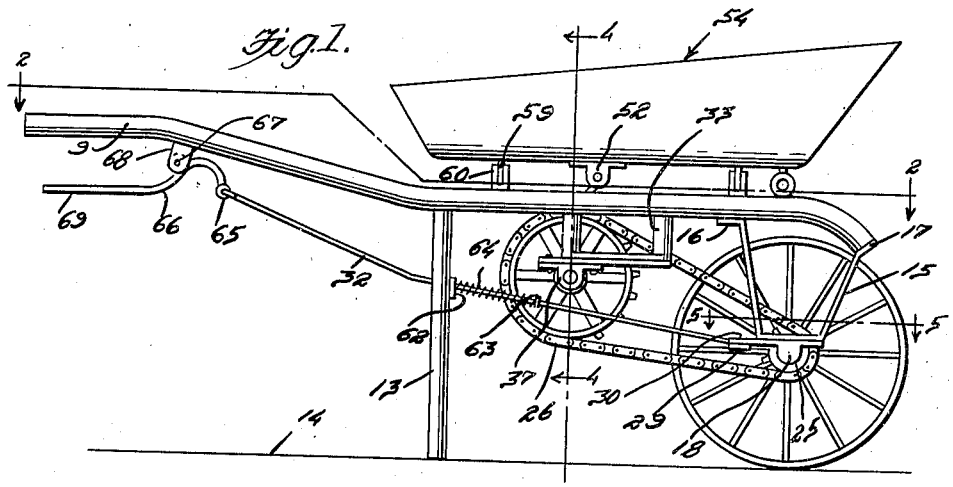
Figure 1 is a general right hand side elevational view of the embodiment.
Figure 2:
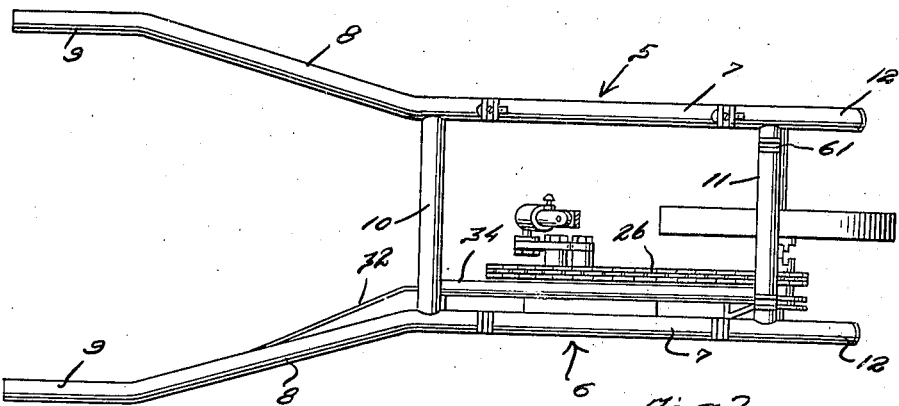
Figure 2 is a sectional view on line 2—2 of Figure 1 and looking in the direction of the arrows.
Figure 5:
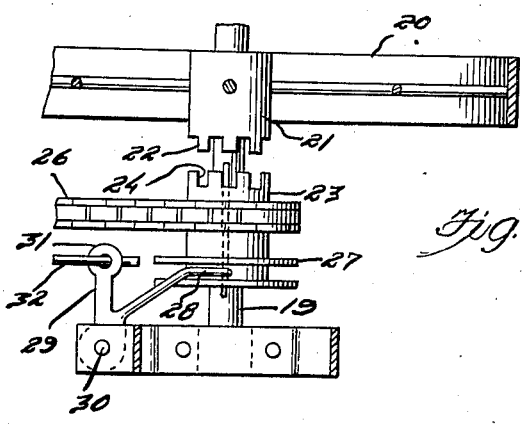
Figure 5 is a fragmentary enlarged horizontal sectional view taken along the line 5—5 of Figure 1 and looking in the direction of the arrows.

Referring in detail to the drawings, the frame of the wheel barrow consists of two similar longitudinal side bars 5 and 6 which have straight parallel forward portions 7 and rear diverging portions 8, the latter terminating in substantially parallel handles 9. A cross member 10 is connected to and between the rear end portions of the parallel parts 7 while another cross member 11 similarly connects forward portions of the parallel parts 7 to the rear of the downturned portions 12. Feet 13 depend from the rear extremities of the parallel portions 7 to engage the ground 14 to support the frame on the ground at the desired elevation as shown in Figure 1.

U-shaped bars 15 having divergent legs connected at their upper ends at 16 and at 17, respectively, have bearing portions 18 on the bight portion thereof journaling the opposite ends of an axle 19 on which is fixed the single barrow wheel 20 including the hub 21 which is circumferentially castellated as indicated by the numeral 22 to constitute the stationary member of a clutch arrangement.

The said clutch arrangement includes the shiftable member 23 having the castellated teeth 24 to match the teeth 22, the clutch element 23 being slidable along the shaft 19 to engage and disengage its teeth with the teeth of the hub 21. The shiftable clutch element 23 includes the sprocket wheel 25 over which is trained a sprocket chain 26. The slidable clutch element 23 also includes a pair of annuli constituting a channel 27 rotatably and slidably receiving the finger 28 on the bellcrank 29 which is pivotally mounted at 30 on a portion of the axle bearing structure to the rear of the right hand U-shaped member 15. The finger 28 is one arm of the said bellcrank 29, the remaining arm having an eye 31 through which slides the shift rod 32, a stop being provided on the forward end of the shift rod which will engage the eye 31 and draw the eye 31 rearwardly when the shift rod is operated, so as to cause the finger 28 to push the clutch element 23 into operative engagement with the clutch element 21 thereby to cause the travel of the wheel 20 over the ground to be transmitted to the sprocket chain 26.

To the rear of the structure just described a U-shaped member 33 depends from the frame side member 6. A longitudinal brace 34 is connected between the cross members 10 and 11 and lies close to and substantially parallel to the frame side member 6 and approximately on a level therewith. A second U-shaped member 35 depending from the longitudinal brace 34 alongside the U-shaped member 33 provides a mounting for the plate 36 which is also attached to the bight portion of the U-shaped member 33, the said plate supporting at its rear part the bearing 37 and the bearing 38 in which turns the shaft 39 which extends in a laterally inward direction and has affixed thereto the larger sprocket wheel 40 over which the sprocket chain 26 is trained. At the laterally inward side of the sprocket wheel 40 the shaft 39 has a stud bolt 41, and a lug 42 eccentrically placed on the said sprocket wheel has a stud 43. These studs pass through the longitudinal slot 44 of a transversely adjustable member 45 which has on the free end thereof a laterally projecting boss 46 on the terminal end of which is a ball 47 mounted in a socket 48 which has a reduced shank 49 telescoped in the lower end of a tubular connecting rod 50 which has a set screw 51 to lock the adjustment of the shank 49. The upper end of the connecting rod 50 has a universal joint connection 52 with the bottom 53 of the wheel barrow tray 54 at a point intermediate the ends thereof and over the sprocket wheel 40 as indicated in Figures 1, 3 and 4.

The tray 54 is of a generally conventional shape and arrangement but has along one side of the bottom thereof the lugs 55 which are positioned between ears 56 on the upper side of the frame side member 5, the said ears and the lugs being traversed by pivot bolts 57 each of which is held removably in place by a cotter pin or the like 58. It will be observed that the universal connection 52 is laterally spaced in an inward direction with respect to the axes of the pivot pins 57 so that upon a rise of the connecting rod 50 to the right hand side of the tray 54 will be tilted upwardly and the left hand side tilted downwardly over the side of the frame of the barrow, so that the contents of the tray will be deposited upon the ground 14.

Other longitudinally spaced lugs 59 along the right hand side of the bottom of the tray are provided to seat between pairs of ears 60 on the upper side of the frame side member 6 while the tray is in normal position so that the tray is prevented from shifting.

Other pairs of ears 61 on the front cross member 11 receive similar lugs on the forward part of the bottom of the tray to prevent sidewise motion of the tray in service.

The clutch operating rod 32 passes rearwardly through a support 62 and has a stop 63 with a coiled extending spring 64 between the stop and the support 62 to force the rod normally in a forward inoperative position. The rear end of the shift rod is flexibly connected at 65 to the forward terminal of a J-shaped lever 66 which is pivoted at 67 on a lug 68 depending from the right hand handle 9. Drawing upwardly on the portion 69 of the hand lever 66 effects engagement of the clutch element 23 with the clutch element 21 so that as the barrow is pushed forward over the ground the dumping mentioned will be effected.

Although I have shown and described herein a preferred embodiment of my invention, it is to be definitely understood that I do not desire to limit the application of the invention thereto except as may be required by the scope of the subjoined claims.

Having described the invention, what is claimed as new is:

1. A wheel barrow comprising a frame, a ground engaging wheel supporting the forward part of said frame, a tiltable tray mounted on said frame, means mounted on said frame and operatively connected to the tray for dumping the same, and operating means connected between said ground engaging wheel and the first-mentioned means.

2. A wheel barrow comprising a frame, a ground engaging wheel supporting the forward part of said frame, a laterally tiltable tray mounted on said frame, means mounted on said frame and operatively connected to the tray for dumping the same, and operating means connected between said ground engaging wheel and the first-mentioned means, the last-mentioned means including manually operated clutch means.

JOHN ALBIN PETERSON.